(12) United States Patent
Harada

(10) Patent No.: US 9,196,247 B2
(45) Date of Patent: Nov. 24, 2015

(54) VOICE RECOGNITION METHOD AND VOICE RECOGNITION APPARATUS

(71) Applicant: FUJITSU LIMITED, Kawasaki-shi, Kanagawa (JP)

(72) Inventor: Shouji Harada, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 278 days.

(21) Appl. No.: 13/846,234

(22) Filed: Mar. 18, 2013

(65) Prior Publication Data

US 2013/0289992 A1    Oct. 31, 2013

(30) Foreign Application Priority Data

Apr. 27, 2012    (JP) ................................ 2012-102942

(51) Int. Cl.
*G10L 15/20* (2006.01)

(52) U.S. Cl.
CPC ..................... *G10L 15/20* (2013.01)

(58) Field of Classification Search
CPC ................ G10L 15/00; G10L 15/20
See application file for complete search history.

(56) References Cited

U.S. PATENT DOCUMENTS

| 4,829,578 | A | * | 5/1989 | Roberts | 704/233 |
| 5,749,068 | A | * | 5/1998 | Suzuki | 704/233 |
| 5,761,639 | A | * | 6/1998 | Takebayashi et al. | 704/253 |
| 6,044,343 | A | * | 3/2000 | Cong et al. | 704/236 |
| 6,418,412 | B1 | * | 7/2002 | Asghar et al. | 704/256.5 |
| 2002/0161581 | A1 | * | 10/2002 | Morin | 704/240 |
| 2004/0181409 | A1 | * | 9/2004 | Gong et al. | 704/256 |
| 2004/0204937 | A1 | * | 10/2004 | Zhang et al. | 704/233 |
| 2004/0260547 | A1 | * | 12/2004 | Cohen et al. | 704/233 |

* cited by examiner

*Primary Examiner* — Douglas Godbold
(74) *Attorney, Agent, or Firm* — Oblon, McClelland, Maier & Neustadt, L.L.P.

(57) ABSTRACT

A voice recognition method includes: detecting a vocal section including a vocal sound in a voice, based on a feature value of an audio signal representing the voice; identifying a word expressed by the vocal sound in the vocal section, by matching the feature value of the audio signal of the vocal section and an acoustic model of each of a plurality of words; and selecting, with a processor, the word expressed by the vocal sound in a word section based on a comparison result between a signal characteristic of the word section and a signal characteristic of the vocal section.

17 Claims, 12 Drawing Sheets

FIG. 10

| SYLLABLE | THRESHOLD VALUE | SYLLABLE | THRESHOLD | | SYLLABLE | THRESHOLD |
|---|---|---|---|---|---|---|
| A | 0.90 | KA | 0.90 | ... | RU | 0.80 |
| I | 0.75 | KI | 0.70 | | RE | 0.80 |
| U | 0.80 | KU | 0.70 | | RO | 0.85 |
| E | 0.85 | KE | 0.85 | | WA | 0.90 |
| O | 0.90 | KO | 0.90 | | NN | 0.75 |

FIG. 11

| NOTATION | READING | THRESHOLD VALUE |
|---|---|---|
| FUKUYAMA | FU-KU-YA-MA | 0.80 |
| AKITA | A-KI-TA | 0.83 |
| NIIMI | NI-I-MI | 0.70 |

FIG. 12

| PHONEME | THRESHOLD VALUE | PHONEME | THRESHOLD VALUE | | PHONEME | THRESHOLD VALUE |
|---|---|---|---|---|---|---|
| a | 0.90 | k | 0.80 | ... | b | 0.85 |
| i | 0.75 | s | 0.70 | | d | 0.85 |
| u | 0.80 | θ | 0.70 | | f | 0.70 |
| e | 0.85 | r | 0.70 | | g | 0.85 |
| o | 0.90 | n | 0.80 | | h | 0.70 | ial configuration diagram of a voice
VOICE RECOGNITION METHOD AND VOICE RECOGNITION APPARATUS

CROSS-REFERENCE TO RELATED APPLICATION

This application is based upon and claims the benefit of priority from the prior Japanese Patent Application No. 2012-102942 filed on Apr. 27, 2012, the entire contents of which are incorporated herein by reference.

FIELD

The embodiments discussed herein are related to a voice recognition technique.

BACKGROUND

In voice recognition techniques in which a vocal section to be a target of voice recognition is detected from a vocal sound of a person to be recognized, and a word uttered in the vocal section is recognized, some of the techniques for suppressing influence of noise have been known.

For example, as a first technique, a technique has been known in which a threshold value of voice power to be used for determination of a vocal section is adaptively changed so that noise is not mistakenly detected as a vocal section in order that only a vocal sound of a person to be recognized is detected as a vocal section.

Also, for example, as a second technique, a technique has been known in which word matching is performed using normalized power of a vocal sound of a person to be recognized so that misrecognition caused by noise is suppressed.

Also, for example, as a third technique, a technique has been known in which word matching is performed using a ratio of vowel to consonant in a vocal section so that that misrecognition caused by noise is suppressed.

Also, a technique enabling to exclude influence of non-stationary noise on estimation has been known in which a noise level in an audio signal is estimated based on power information related to a partial distribution taken out from the power distribution of the signal in accordance with a maximum frequency power in a power distribution of the signal.

Also, a technique enabling to detect an optimum voice section has been known in which a plurality of sets of threshold values at the time when a parameter used for detecting a vocal section is obtained from an input signal are provided, and an optimum set of threshold values is selected in accordance with a signal-to-noise ratio of the input signal.

SUMMARY

According to an aspect of the invention, a voice recognition method includes: detecting a vocal section including a vocal sound in a voice, based on a feature value of an audio signal representing the voice; identifying a word expressed by the vocal sound in the vocal section, by matching the feature value of the audio signal of the vocal section and an acoustic model of each of a plurality of words; and selecting, with a processor, the word expressed by the vocal sound in a word section based on a comparison result between a signal characteristic of the word section and a signal characteristic of the vocal section.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 10 is an example of a syllable threshold value table;

FIG. 11 is an example of a word dictionary; and

FIG. 12 is an example of a phoneme threshold value table.

DESCRIPTION OF EMBODIMENTS

Hereinafter, embodiments will be described based on the drawings.

While inventing the embodiments, observations were made regarding a related art. Such observations include the following, for example.

In a voice recognition technique of the related art, when a vocal sound of a person to be recognized is obtained by a microphone in order to perform voice recognition, a vocal sound of another person in the surroundings is sometimes mixed in the obtained vocal sound, and the mixed vocal sound sometimes causes misrecognition of a word.

Hence, when a vocal section is detected using a threshold value of voice power in the same manner as in the first technique described above, there is a condition to be met that a minimum value of vocal sound power of a person to be recognized is larger than a maximum value of vocal sound power of another person all the time. If this condition is not met, a vocal sound of another person may be mixed into a vocal section, or a vocal sound of a person to be recognized may be excluded from a vocal section. Also, when misrecognition caused by a vocal sound of another person is tried to be suppressed using the second and the third techniques described above, if a vocal sound of another person is mixed with a certain high voice power, a feature value becomes similar because a vocal sound of the other person is a human voice. As a result, misrecognition may occur. Namely, by these techniques, it is difficult to suppress misrecognition unless voice power of a vocal sound of a person to be recognized is substantially larger than voice power of vocal sounds of the other persons.

Figure 1:
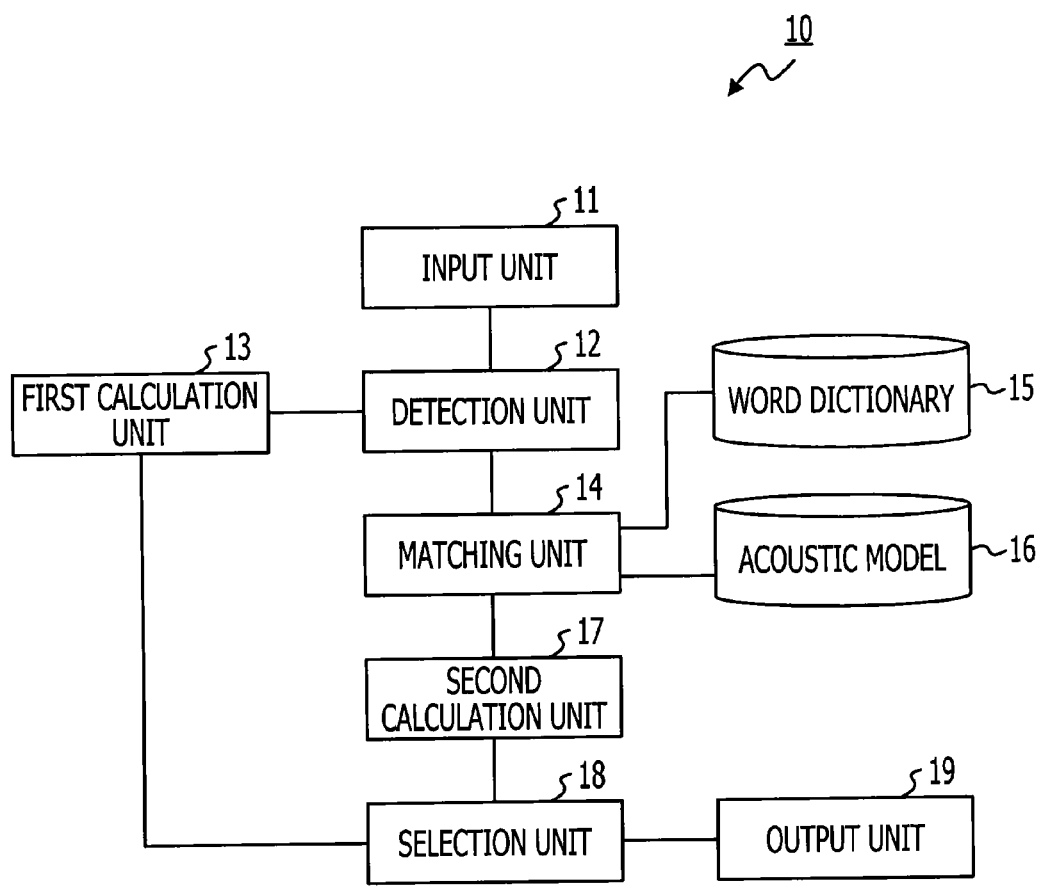
FIG. 1 is a functional configuration diagram of a voice recognition apparatus according to an embodiment.

In the embodiments, FIG. 1 is a functional configuration diagram of a voice recognition apparatus according to an embodiment. A voice recognition apparatus 10 in FIG. 1 includes an input unit 11, a detection unit 12, a first calculation unit 13, a matching unit 14, a word dictionary 15, an acoustic model 16, a second calculation unit 17, a selection unit 18, and an output unit 19.

The input unit 11 receives an audio signal representing sound, and calculates a feature value of the sound from the audio signal. In this regard, in the present embodiment, the input unit 11 is assumed to calculate power of the voice from the audio signal as the feature value. In this regard, the audio signal to be inputted into the input unit 11 may be, for example, digital data that is converted from an analog signal outputted from a microphone collecting sound, which is not illustrated in the figure. Also, a data file of an audio signal stored in a storage device not illustrated in the figure may be input.

The detection unit 12 detects a vocal section including vocal sound in the sound represented by the audio signal using the feature value of the audio signal calculated by the input unit 11. In the present embodiment, the detection unit 12 obtains an average value of the voice power calculated by the input unit 11, and detects a vocal section using the average value. More specifically, the detection unit 12 detects time when voice power becomes larger than the average value by a given threshold value α or more to be a start point of the vocal section. Also, detection unit 12 detects a case where voice power that is not greater than the average value by a given threshold value β continues for a given time period (for example, one second) after the detection of the start point of the vocal section, and determines the beginning of the period to be an end point of the vocal section.

The first calculation unit 13 calculates a signal-to-noise ratio (SNR) of the vocal section detected by the detection unit 12. It is possible to use various methods for a method of calculating the SNR. In the present embodiment, the first calculation unit 13 calculates the SNR using either of the methods, (A) or (B), described below.

(A) The first calculation unit 13 first obtains a minimum value of voice power of the input audio signal or a minimum value of voice power of the audio signal in a vocal section as a value of noise N, and obtains a maximum value of voice power of the audio signal in the vocal section as a value of a signal S. Here, the first calculation unit 13 calculates an SNR value using the following expression (1), and determines the calculated value as a calculation result of an SNR of the vocal section detected by the detection unit 12.

$$\text{SNR [dB]} = 10 \log_{10}(S/N) \quad (1)$$

(B) The first calculation unit 13 calculates an SNR of the audio signal in a given section including the vocal section detected by the detection unit 12. Namely, the first calculation unit 13 first sets a calculation target section to a section produced by adding the vocal section detected by the detection unit 12 and a section of a given period (for example, five minutes) before and after the vocal section. In this regard, in the setting of a calculation target section, the detection unit 12 may set calculation target section to a section produced by adding the vocal section detected by the detection unit 12 and only a section of a section of a given period (for example, five minutes) before the vocal section. When the calculation target section is set in this manner, it is preferable for the case of using the voice recognition apparatus 10 for immediately presenting a recognition result to a speaker. Next, the first calculation unit 13 obtains an average value and a standard deviation of the voice power of the audio signal in the calculation target section. Here, the first calculation unit 13 calculates the average value of the values smaller than a value produced by subtracting the standard deviation of the voice power from the average value of the voice power among voice power of the audio signal in the calculation target section, and determines the calculated average value to be a value of the noise N. Also, the first calculation unit 13 calculates an average value of the values larger than a value produced by adding the standard deviation of the voice power to the average value of the voice power among voice power of the audio signal in the calculation target section, and determines the calculated average value to be a value of the signal S. And the first calculation unit 13 calculates a value of the SNR using the expression (1), and determines the calculated value as a calculation result of the SNR of the vocal section detected by the detection unit 12.

The matching unit 14 matches the feature value of the audio signal of the vocal section detected by the detection unit 12 with an acoustic model for each of a plurality of words so as to identify a word expressed by the vocal sound of the detected vocal section. In the present embodiment, the matching unit 14 generates a word model from the word dictionary 15 and the acoustic model 16, and obtains a matching score indicating height of similarity between the feature value of the audio signal of the vocal section and the generated word model in order to identify a word having the matching score of a given threshold value or more. Here, the word model is generated, for example, by concatenating a syllable string, which is a reading of a word stored in the word dictionary 15, and an acoustic model 16 (for example, an HMM (Hidden Markov Model)) for each syllable and for each phoneme, which is corresponding to a phoneme string. Also, for a feature value of an audio signal, for example, MFCC (Mel Frequency Cepstral Coefficient) or a power difference is used. After that, the matching unit 14 matches the word model with the feature value of the audio signal, and calculates probability of matching of the both as a matching score. And the matching unit 14 identifies a word or a word string having a highest calculated probability value. In this regard, the matching unit 14 may identify a plurality of words or word strings having the calculated probability value satisfying a certain criterion, for example, a criterion in which a probability value for each one frame is a given probability value or more.

The second calculation unit 17 calculates an SNR of a word section expressing a vocal sound of the word identified by the matching unit 14 in the vocal section detected by the detection unit 12. It is possible to use various methods for a method of calculating the SNR in the same manner as the first calculation unit 13. In the present embodiment, the second calculation unit 17 calculates the SNR using either of the methods, (C) or (D), described below in accordance with the method used by the first calculation unit 13.

(C) In the case where the first calculation unit 13 uses the method (A) described above, the second calculation unit 17 uses the same value as the value of the noise N used by the first calculation unit 13 as a noise N, and obtains a maximum value of voice power of the audio signal in the word section as a value of the signal S. And the second calculation unit 17 calculates a value of the SNR using the expression (1) described above, and determines the calculated value as a calculation result of the SNR of the word section.

(D) In the case where the first calculation unit 13 uses the method (B), the second calculation unit 17 uses the same value as the value of the noise N used by the first calculation unit 13 as a noise N. Also, the second calculation unit 17 calculates an average value of the values greater than a value produced by adding a standard deviation of the voice power to the average value of the voice power of the audio signal in a calculation target section among the voice power of the audio signal in the word section, and determines the calculated average value to be the signal S. And the second calculation unit 17 calculates a value of the SNR using the expression (1) described above, and determines the calculated value as a calculation result of the SNR of the word section.

The selection unit 18 selects a word expressed by the vocal sound of the word section based on the comparison result between the SNR of the word section and the SNR of the vocal section detected by the detection unit 12. In the present embodiment, the selection unit 18 selects a word expressed by the word section having a greater SNR than the SNR of the vocal section by a given lower limit threshold value or more, for example, the selection unit 18 selects a word expressed by the vocal sound of the word section having an SNR higher than the SNR of the vocal section decreased by 12 [dB].

The output unit 19 outputs the word selected by the selection unit 18. The word that is outputted by the output unit 19 is a result of voice recognition of the audio signal inputted into the input unit 11. In this regard, the output unit 19 may output the word by displaying, for example, a character string to be a word notation on a display device. Also, the output unit 19 may output the word in a data file format of that word. Also, if the word is not selected by the selection unit 18, the output unit 19 may output nothing, and may also output a notification that a result of the voice recognition has failed to be obtained.

The voice recognition apparatus 10 in FIG. 1 includes the above-described configuration. With this configuration, an SNR is calculated on the word section expressing the vocal sound of the word identified by the matching unit 14, and the calculated SNR is compared with the SNR of the vocal section. And the word is selected based on the comparison result. Accordingly, even if the audio signal of the vocal section detected on the assumption that a vocal sound of a person to be recognized includes vocal sound of another person, it is possible to suitably provide a result of voice recognition targeted only for vocal sound of the person to be recognized.

In an input audio signal, when voice power of the vocal sound of a person to be recognized is changing, for example, in a range from 3 [dB] to 12 [dB], it is highly possible that voice power of the word section of a person to be recognized has a magnitude close to the upper limit, 12 [dB]. On the other hand, voice power of another person in the audio signal is relatively low compared with that of the person to be recognized, which ranges, for example, from 0 [dB] to 6 [dB]. Accordingly, particularly in a word section, the possibility that voice power of another person includes higher power than that of the person to be recognized is very low. This is because the other person stays farther away from a microphone than the person to be recognized, or the other person is not producing sound toward the microphone. Namely, when vocal sound of the other person is collected by a microphone together with vocal sound of the person to be recognized, the voice power of the vocal sound of the other person is more attenuated than that of the person to be recognized. Accordingly, the voice recognition apparatus 10 in FIG. 1 selects a word as described above so as to suppress an error of outputting a result of the voice recognition of the vocal sound of the other person as a result of voice recognition of the person to be recognized.

In this regard, the selection unit 18 may select a word expressed by the vocal sound of the word section having an SNR which is not lower than a lower limit threshold value and not higher than an upper limit threshold value with respect to the SNR of the vocal section. Namely, for example, the selection unit 18 may select a word expressed by the vocal sound of the word section having an SNR in a range from −12 [dB] to +12 [dB] with respect to the SNR of the vocal section. In this manner, if an upper limit is added to the condition for the SNR of the vocal sound of the word section to be the word selection criterion, it is possible to exclude, from a selection target, a result of the voice recognition based on a loud noise, which is originally unable to be a word recognition target, for example, sound of coughing or sneezing, or sound of door shut, etc. Accordingly, it is possible to suppress an error of outputting a result of the voice recognition of such noise as a result of the voice recognition of the person to be recognized. In this regard, this method is more effective, for example, in the case where the first calculation unit 13 and the second calculation unit 17 use the above-described methods (B) and (D), respectively than in the case of using the above-described methods (A) and (C), respectively.

In the present embodiment, the voice recognition apparatus 10 in FIG. 1, which has the above-described functional configuration, is achieved using a computer.

Figure 2:
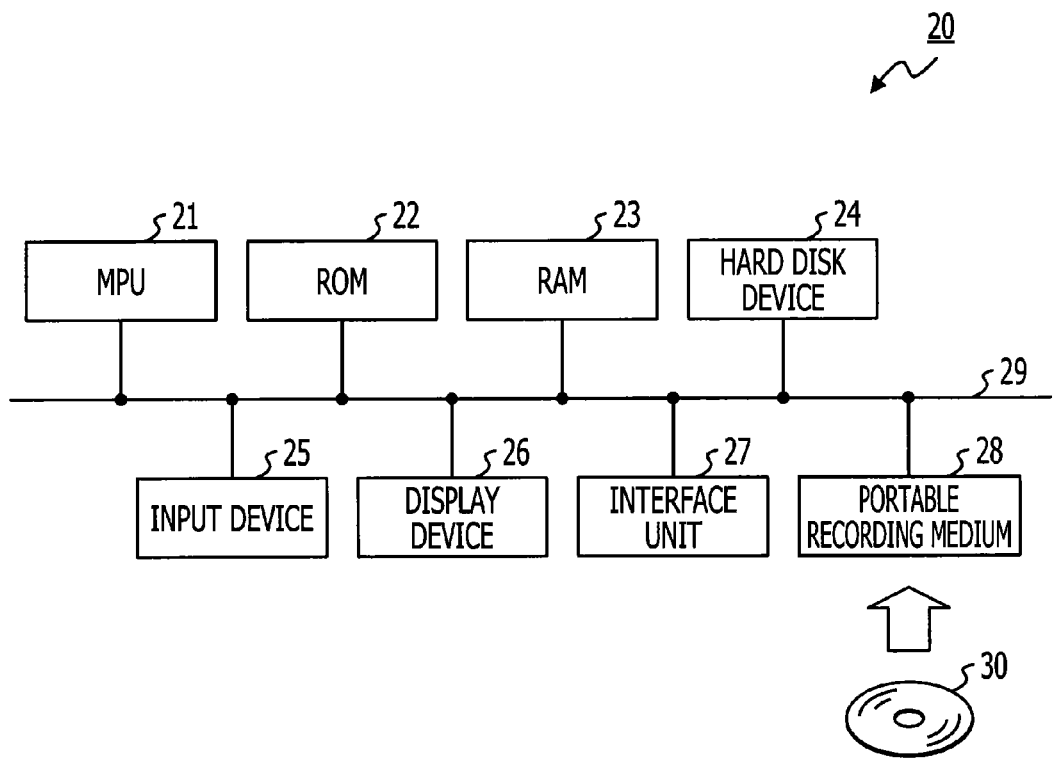
FIG. 2 is a hardware configuration diagram of a computer.

FIG. 2 is a hardware configuration diagram of a computer. The computer 20 in FIG. 2 includes an MPU 21, a ROM 22, a RAM 23, a hard disk unit 24, an input device 25, a display device 26, an interface unit 27, and a recording medium drive unit 28. In this regard, these individual components are connected through a bus line 29, and are capable of sending and receiving various kinds of data under the control of the MPU 21.

The MPU (Micro Processing Unit) 21 is an arithmetic processing unit controlling operation of the entire computer 20.

The ROM (Read Only Memory) 22 is a read-only semiconductor memory in which a given basic control program is recorded in advance. The MPU 21 reads and executes this basic control program at the time of starting the voice recognition apparatus 10, thereby making it possible to control operation of individual components of the computer 20. In this regard, a memory in which storage data is nonvolatile, such as a flash memory, etc., may be used as the ROM 22.

The RAM (Random Access Memory) 23 is a semiconductor memory capable of being written and read at any time, and is used by the MPU 21 as a working storage area as appropriate when the MPU 21 executes various control programs.

The hard disk unit 24 is a storage device for storing various control programs executed by the MPU 21 and various kinds of data. The MPU 21 reads and executes a given control program stored in the hard disk unit 24 so as to become possible to perform various control processing.

The input device 25 is, for example, a keyboard or a mouse. For example, when operated by a user of the computer 20, the input device 25 obtains input of various kinds of information from the user, which is associated with the operation contents, and sends the obtained input information to the MPU 21.

The display device 26 is, for example, a liquid crystal display, and displays various texts and images in accordance with output data sent from the MPU 21.

The interface unit 27 manages transfer of various kinds of data with an external device.

The recording medium drive unit 28 is a device that reads various control programs and data recorded in a portable recording medium 30. It is also possible for the MPU 21 to read a given control program recorded on the portable recording medium 30 through the recording medium drive unit 28, and executes the control program to perform various kinds of control processing. In this regard, as the portable recording medium 30, for example, a CD-ROM (Compact Disc Read Only Memory), a DVD-ROM (Digital Versatile Disc Read Only Memory), a flash memory provided with a USB (Universal Serial Bus) standard connector, etc., are given.

In this manner, the computer 20 has a standard hardware configuration. In order to configure the voice recognition apparatus 10 using the computer 20, for example, a control program causing the MPU 21 to perform the below-described control processing performed by the voice recognition apparatus 10 is created, and the control program is stored in advance, for example, in the hard disk unit 24 or on the portable recording medium 30. And a given instruction is given to the MPU 21 to read this control program to be executed. In this regard, the word dictionary 15 and the acoustic model 16 are stored in advance, for example, in the hard disk unit 24. Alternatively, the word dictionary and the acoustic model 16 may be stored in an external storage device connected through the interface unit 27. In this manner, it becomes possible to function each of the components in FIG. 2 as a corresponding functional block included in the voice recognition apparatus 10 in FIG. 1.

In this regard, as input of the audio signal, for example, an analog signal, which is produced by collecting the vocal sound and outputted from a microphone not illustrated in the figure, is inputted into the interface unit 27, and is converted into digital data by the interface unit 27 to be used. Also, for example, audio signal data stored in a storage device not illustrated in the figure may be obtained through the interface unit 27, and may be inputted to be used as input of the audio signal.

Figure 3:
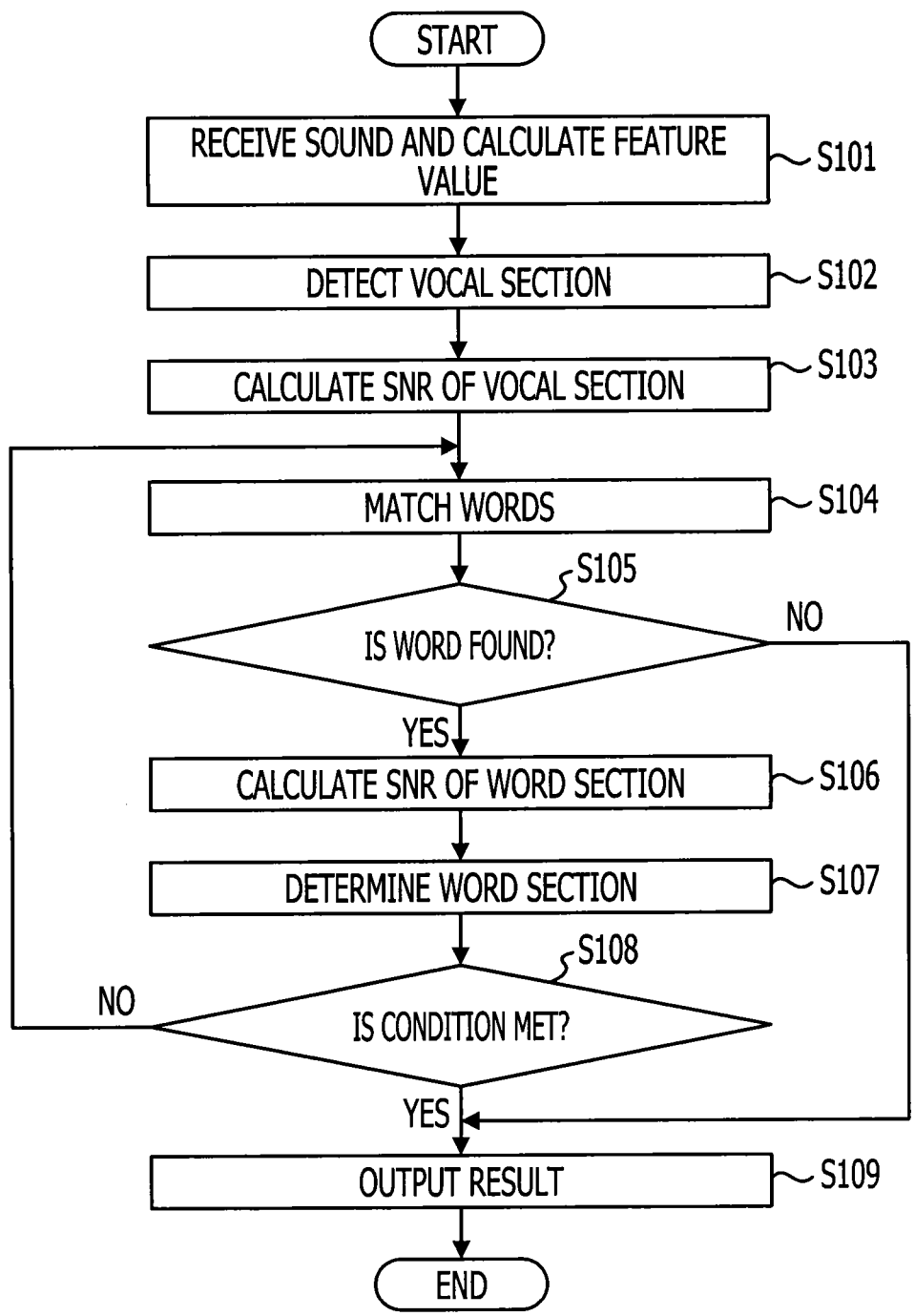
FIG. 3 is a flowchart illustrating a control processing procedure performed by the voice recognition apparatus in FIG. 1.

FIG. 3 is a flowchart illustrating a control processing procedure performed by the voice recognition apparatus 10 in FIG. 1.

When the processing in FIG. 3 is started, first, in S101, the input unit 11 receives an audio signal expressing sound, and performs calculation processing of a feature value of the sound from the audio signal.

In S102, the detection unit 12 performs processing as described above for detecting, from the audio signal, a vocal section including vocal sound expressed by the audio signal using the feature value of the audio signal calculated in the processing and S101.

In S103, the first calculation unit 13 performs processing for calculating an SNR of the vocal section detected by the processing in S102 using either of the above-described methods, (A) or (C).

In S104, as described above, the matching unit 14 performs processing for identifying one word expressed by the vocal sound of the vocal section detected by the matching of the feature value of the audio signal of the vocal section detected by the processing in S102 and an acoustic model of each of the plurality of words. As described above, the matching unit 14 performs the processing in S104 using the word dictionary 15 and the acoustic model 16.

In S105, the matching unit 14 performs processing for determining whether the processing in S104 was able to identify a word expressed by the vocal sound of the vocal section detected by the processing in S102. If the matching unit 14 determines to have been allowed to identify a word here (Yes in the determination result), the processing proceeds to S106, whereas if the matching unit 14 determines not to have been allowed to identify (No in the determination result), the processing proceeds to S109.

In S106, the second calculation unit 17 performs processing for calculating an SNR of the word section expressing the vocal sound of the word identified by the processing in S104 in the vocal section detected by the processing in S102 in the same manner as described above. In this regard, in the processing in S106, the second calculation unit 17 calculates the SNR using either of the methods, (C) or (D), described above in accordance with the method used by the first calculation unit 13.

In S107, the selection unit 18 performs processing for determining whether the SNR of the word section calculated by the processing in S106 matches a given condition. Namely, the selection unit 18 performs processing, for example, for determining whether the SNR of the word section is higher than the SNR of the vocal section calculated by the processing in S103 by a given lower limit threshold value or more, for example, whether the SNR of the word section is higher than the SNR of the vocal section decreased by 12 [dB].

In this regard, in the processing in S107, as described above, the selection unit 18 may perform processing for determining whether the SNR of the word section is higher than the SNR of the vocal section by a given lower limit threshold value or more and not higher than a given upper limit threshold value. Namely, for example, when the first calculation unit 13 and the second calculation unit 17 use the methods (B) and (D), respectively, the selection unit 18 may perform processing for determining whether the SNR of the word section is in a range between J times and K times the SNR of the vocal section. In this regard, in this case, a value of the fixed number J is 0.8, for example, and a value of the fixed number K is 1.2, for example.

In S108, the selection unit 18 performs processing for determining whether the SNR of the word section calculated by the processing in S106 matches a given condition as a result of the determination by the processing in S107. Here, if the selection unit 18 has determined that the SNR of the word section matches the given condition (if the determination result is Yes), the selection unit 18 determines the word identified in the processing in S104 to be a selection result, and after that the processing proceeds to S109. On the other hand, here if the selection unit 18 has determined that the SNR of the word section does not match the given condition (if the determination result is No), the processing returns to S104, and the selection unit 18 causes the matching unit 14 to perform processing for identifying another word.

In S109, the output unit 19 performs processing for outputting the processing result in FIG. 3, and after that, the processing in FIG. 3 is terminated. If the processing in S109 is performed next to the processing in S108, the output unit 19 outputs the word selected by the selection unit 18 in the processing in S108 as described above. Also, if the processing in S109 is performed next to the processing in S105, the output unit 19 outputs a notification that a result of the voice recognition has not been obtained, or outputs nothing.

The voice recognition apparatus 10 in FIG. 1 performs the above control processing so as to suitably provide a result of the voice recognition targeted only for vocal sound of a person to be recognized even if vocal sound of another person is included.

In this regard, in the control processing in FIG. 3, a word is identified for each one word by the processing in S104, and then the word is processed from S105 to S108. In place of this, a plurality of words may be identified in the processing in S104, and then the plurality of words may be individually processed in parallel in the processing from S105 to S108.

Figure 4:
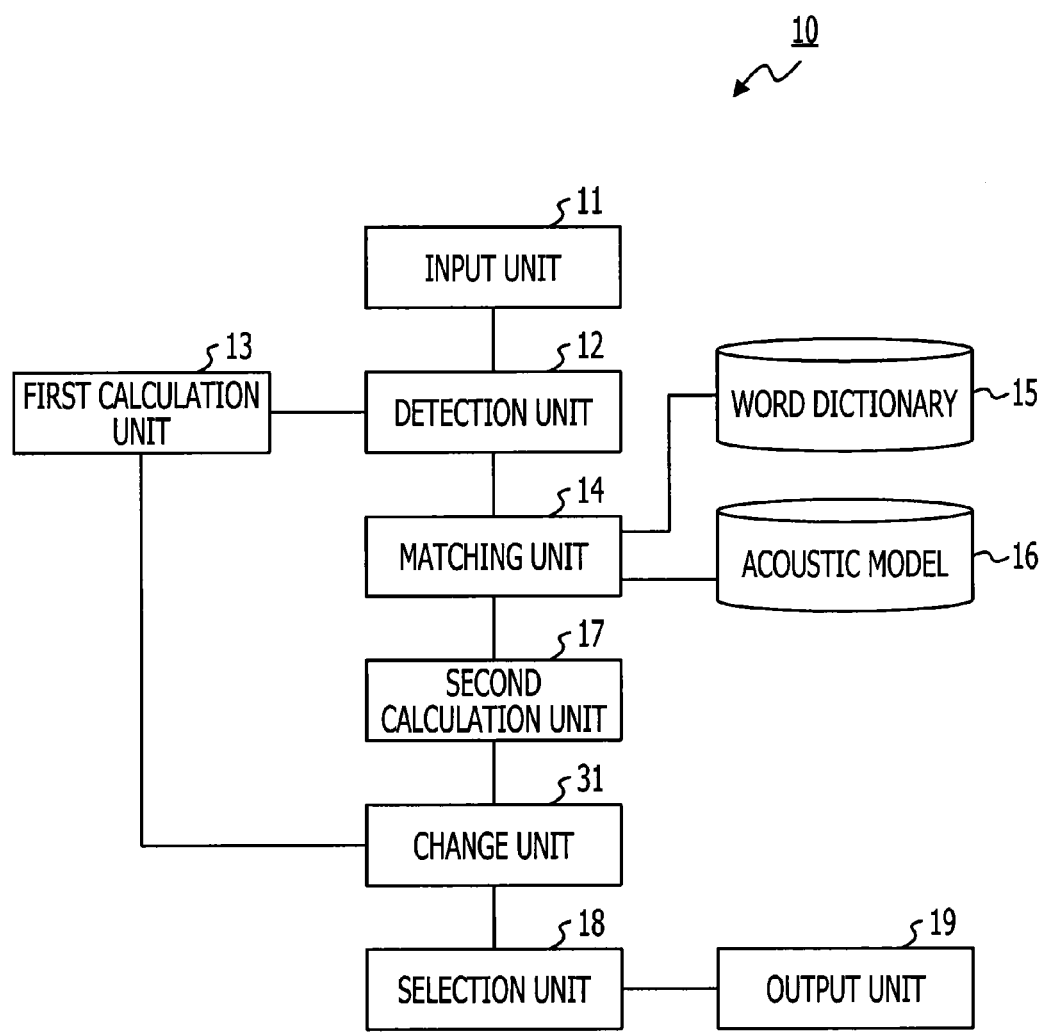
FIG. 4 is a functional configuration diagram of a voice recognition apparatus according to another embodiment.

FIG. 4 is a functional configuration diagram of a voice recognition apparatus according to another embodiment.

In the configuration of the voice recognition apparatus 10 illustrated in FIG. 4, a same reference sign is given to a same functional block as that illustrated in FIG. 1. In the following description, it is assumed that functional blocks that are not described in particular provide the same functions as those illustrated in FIG. 1.

The voice recognition apparatus 10 in FIG. 4 further includes a change unit 31 in addition to the same individual functional blocks as those in FIG. 1. The change unit 31 changes the matching score obtained by the matching unit 14 on the word expressed by the vocal sound of the word section based on a comparison result between the SNR of the word section calculated by the second calculation unit 17 and the SNR of the vocal section calculated by the first calculation unit 13.

In this regard, in the configuration in FIG. 4, which includes the change unit 31, the selection unit 18 selects a word expressed by the vocal sound of the word section based on the matching score of the word.

Here, a description will be given of the changing of the matching score by the change unit 31 and the selection of a word by the selection unit 18 based on the matching score using FIGS. 5A and 5B.

Figure 5A:
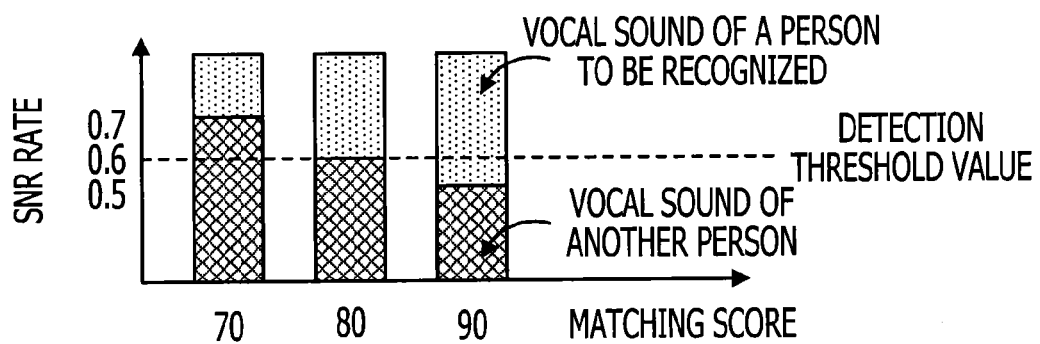
FIGS. 5A and 5B are explanatory diagrams of word selection based on a matching score.
Figure 5B:
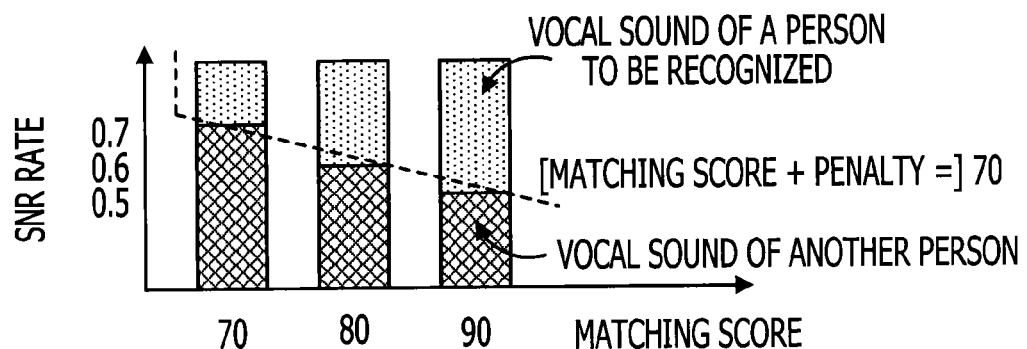

Graphs illustrated in FIGS. 5A and 5B, indicate a general tendency of a relationship between the matching score obtained for the word when the matching unit 14 identified a word of the vocal sound of the vocal section, and a rate of the SNR of the word section to that of the vocal section.

In general, if it is not possible to obtain voice power of vocal sound sufficiently, the similarity between a feature value of vocal sound in a vocal section and an acoustic model of a word becomes low. Also, it has been already described that vocal sound of a person other than a person to be recognized in a vocal section has generally smaller voice power than that of the vocal sound of the person to be recognized. Accordingly, in general, there is a tendency that a matching score obtained at the time when the matching unit 14 has identified a word of the vocal sound of a person other than a person to be recognized is smaller than the matching score obtained for the vocal sound of a person to be recognized. The graphs in FIGS. 5A and 5B indicate this tendency, and in the case of the same matching score, and it is understood that the rate of the vocal sound of a person other than a person to be recognized to the vocal sound of the person to be recognized becomes larger as the matching score becomes low.

The graph in FIG. 5A indicates the case where the selection unit 18 selects a word by a comparison between the SNR rate and a given detection threshold value regardless of the matching score. In this regard, the example of the graph in FIG. 5A indicates the case where the detection threshold value is set to "0.6", which is assumed to optimum when the matching score is "80". However, by this setting, in the case where the matching score is "70", the possibility that the selection unit 18 mistakenly selects the word of the vocal sound of a person other than a person to be recognized, identified by the matching unit 14, becomes high. Also, in the case where the matching score is "90", the possibility that the selection unit 18 mistakenly excludes the word of the vocal sound of the person to be recognized, identified by the matching unit 14, becomes high.

Thus, the change unit 31 in the voice recognition apparatus 10 in FIG. 4 changes the matching score of the vocal sound of the word section, obtained by the matching unit 14, based on the comparison result between the SNR of the word section and the SNR of the vocal section. More specifically, if the rate of the SNR of the word section and the SNR of the vocal section is less than a given threshold value, the change unit 31 impose a penalty by subtracting points from the matching score of the word expressed by the vocal sound of the word section, obtained by the matching unit 14. And the selection unit 18 selects a word expressed by the vocal sound of the word section based on the matching score of the word.

The graph in FIG. 5B indicates the case where when the rate of the SNR of the word section to the SNR of the vocal section is less than 0.7, the change unit 31 subtracts a value of 10 from the matching score for each decrease of 0.1 from the rate as a penalty. Accordingly, a penalty 10 is imposed on the matching score for a word having the SNR rate from 0.6 to 0.7, and a penalty 20 is imposed on the matching score for a word having the SNR rate from 0.5 to 0.6.

In this regard, in the example of graph in FIG. 5B, it is assumed that the selection unit 18 selects a word having a matching score of 70 or more as a word expressed by the vocal sound of a word section. Then, if the matching score is "80", a word having the SNR rate of "0.6" or more is selected. The word selected in this case is the same as in the case of the graph in FIG. 5A. On the other hand, in the example of the graph in FIG. 5B, in the case where the matching score is "70", a word having the SNR rate of "0.7" or more is selected, and in the case where the matching score is "90", a word having the SNR rate of "0.5" or more is selected. Accordingly, by selecting a word as the graph in FIG. 5B, it becomes possible to more suitably select a word than in the case of the graph in FIG. 5B.

In the present embodiment, the voice recognition apparatus 10 in FIG. 4, which has the above-described functional configuration, is achieved using the computer 20 including the hardware configuration illustrated in FIG. 2. For this purpose, for example, a control program for causing the MPU 21 to perform the below-described control processing performed on the voice recognition apparatus 10 is stored, for example, in a hard disk unit 24 or a portable recording medium 30 in advance. And the MPU 21 receives a given instruction to read and execute this control program. In this regard, the word dictionary 15 and the acoustic model 16 are stored, for example, in the hard disk unit 24 in advance. Alternatively, the word dictionary 15 and the acoustic model 16 may be stored in an external storage device connected through the interface unit 27. In this manner, it becomes possible for each of the components in FIG. 2 to function as a corresponding functional block included in the voice recognition apparatus 10 in FIG. 4.

Figure 6:
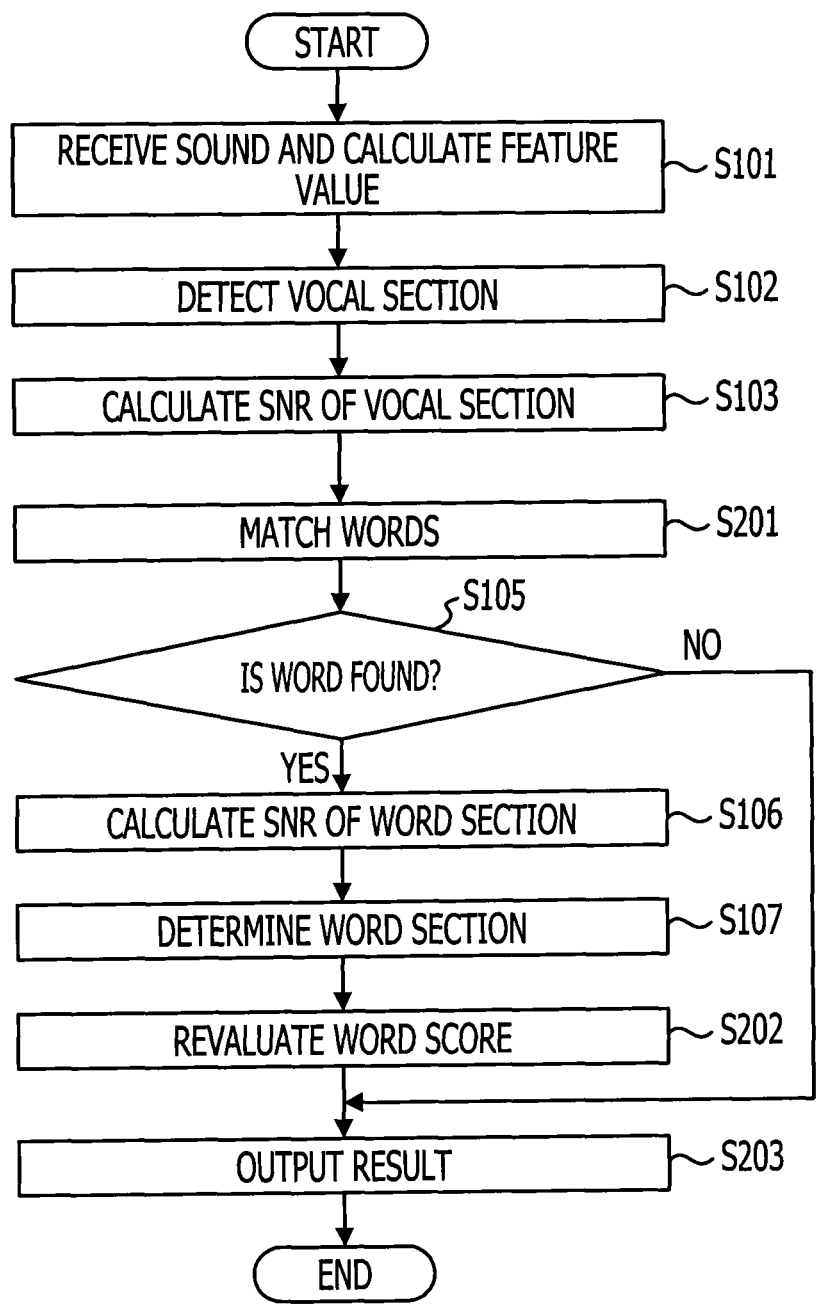
FIG. 6 is a flowchart illustrating a control processing procedure performed by the voice recognition apparatus in FIG. 4.

FIG. 6 is a flowchart illustrating a control processing procedure performed by the voice recognition apparatus 10 in FIG. 4.

First, the processing from S101 to S103 in FIG. 6 has the same processing contents as those in the flowchart illustrated in FIG. 3, and thus the description thereof is omitted here.

In S201, which follows S103, the same matching processing as that of S104 in FIG. 3 is performed by the matching unit 14. Note that in S201, the matching unit 14 identifies a word, and performs processing for outputting a matching score calculated for identifying the word in association with the identified word.

The processing from S105 to S107, which follows S201, has the same processing contents as those in the flowchart illustrated in FIG. 3, and thus the description thereof is omitted here.

In S202, which follows S107, if the SNR of the word section calculated in S106 does not meet the given condition in the determination processing in S107, the change unit 31 performs processing by subtracting points from the matching score of the word identified by the processing in S201 to impose a penalty. In the present embodiment, the subtraction of points at this time is uniform. However, as the example of the graph in FIG. 5, subtraction points may be determined to be large in accordance with a degree of difference from the given condition on the SNR of the word section.

In this regard, if the matching unit 14 calculates, as a matching score, for example, a distance between a model of this word and a feature value of the audio signal, the matching score indicates higher similarity between the two as the matching score becomes smaller. Accordingly, in this case, in order to impose a penalty on the matching score of the word identified in the processing in S201, the change unit 31 performs processing for adding points to the matching score.

In S203, the output unit 19 performs processing for outputting the processing result in FIG. 6. After that, the processing in FIG. 6 is terminated. If the processing in S203 is performed next to the processing in S202, the output unit 19 outputs the word identified by the processing in S201. In this regard, the output unit 19 may output a matching score of the word together with the output of the word. Also, when the output unit 19 outputs a plurality of words, the output unit 19 may rearrange the individual words in order of the matching score to output the individual words. Further, the output unit 19 may output only a given number of words having high matching scores. In this regard, if the processing in S203 is performed next to the processing in S105, in the same manner as the processing in S109 in FIG. 3, the output unit 19 outputs a notification that a result of the voice recognition has not been obtained, or outputs nothing.

The voice recognition apparatus 10 in FIG. 4 performs the above control processing so as to suitably provide a result of the voice recognition targeted only for vocal sound of a person to be recognized even if vocal sound of the other person is included.

Figure 7:
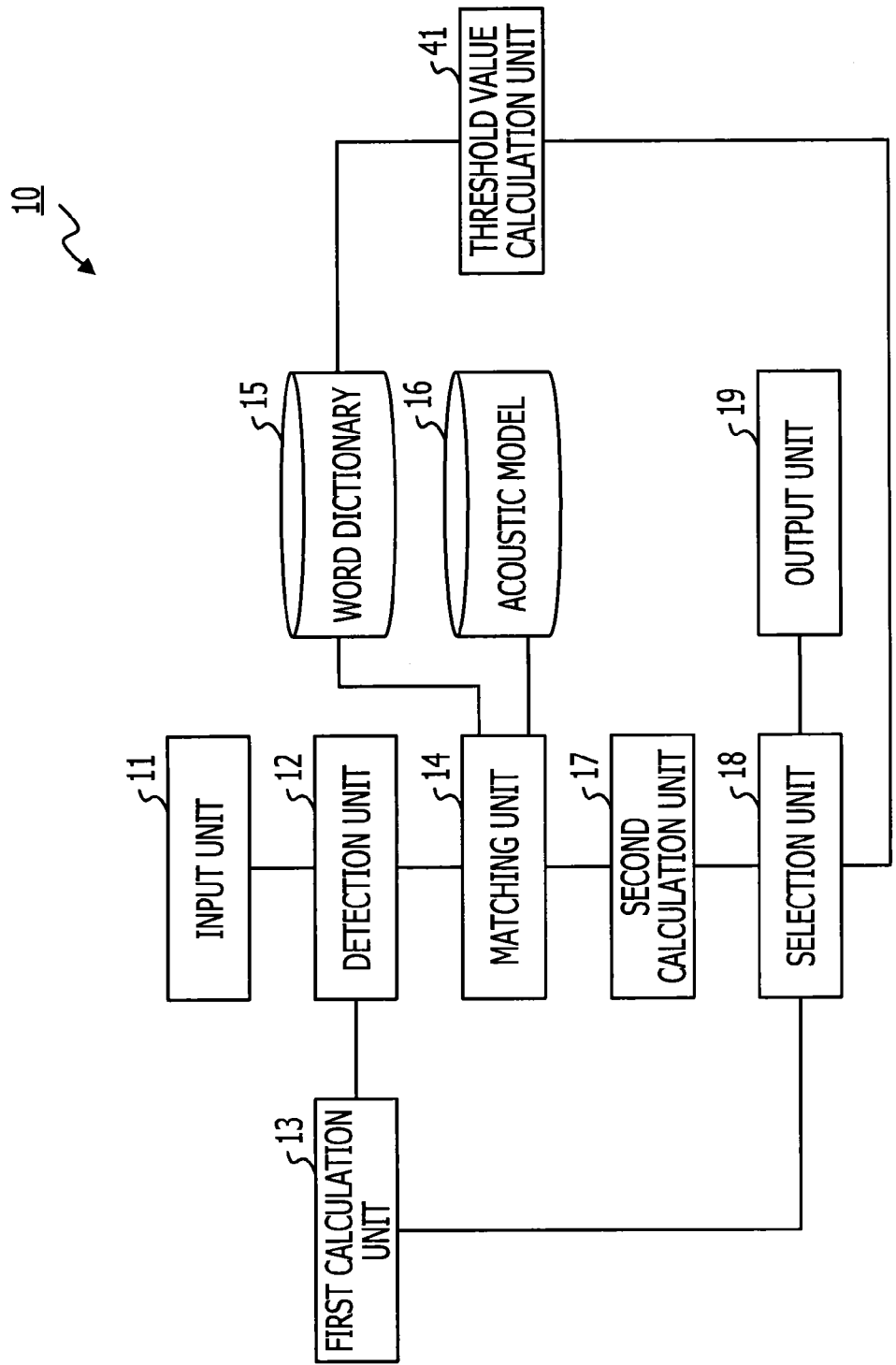
FIG. 7 is a functional configuration diagram of a voice recognition apparatus according to still another embodiment.

FIG. 7 is a functional configuration diagram of a voice recognition apparatus according to still another embodiment.

In the configuration of the voice recognition apparatus 10 illustrated in FIG. 7, a same reference sign is given to a same functional block as that illustrated in FIG. 1. In the following description, it is assumed that functional blocks that are not described in particular provide the same functions as those illustrated in FIG. 1.

The voice recognition apparatus 10 in FIG. 7 further includes a threshold value calculation unit 41 in addition to the same individual functional blocks as those in FIG. 1.

In the configuration in FIG. 7, the selection unit 18 selects a word expressed by the word section having a greater SNR than the SNR of the vocal section by a given lower limit threshold value or more. However, the selection unit 18 makes the selection using a lower limit threshold value associated with each word to be selected as the lower limit threshold value to be used for the selection of the word. The threshold value calculation unit 41 calculates the lower limit threshold value of the word to be selected by the selection unit 18 based on reading information of the word. More specifically, the threshold value calculation unit 41 in the present embodiment makes the calculation of the lower limit threshold value of the word to be selected by the selection unit 18 by calculating the average value of the threshold values provided for individual syllables of the reading of the word.

Here, a description will be given of an effect produced by the voice recognition apparatus 10 in FIG. 7 using FIGS. 8A and 8B.

Figure 8A:
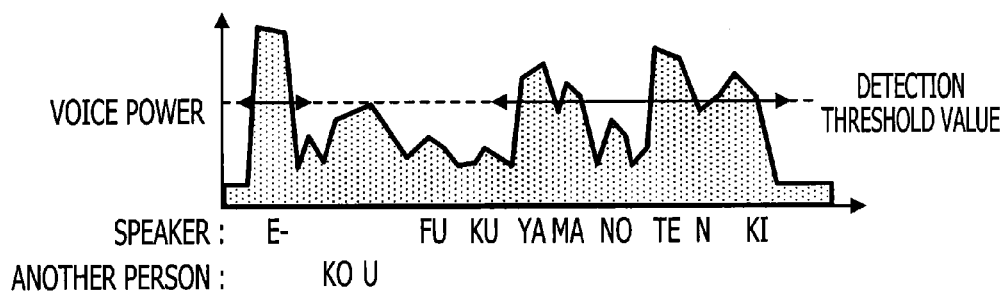
FIGS. 8A and 8B are an explanatory diagrams of effects taken by the voice recognition apparatus in FIG. 7.
Figure 8B:
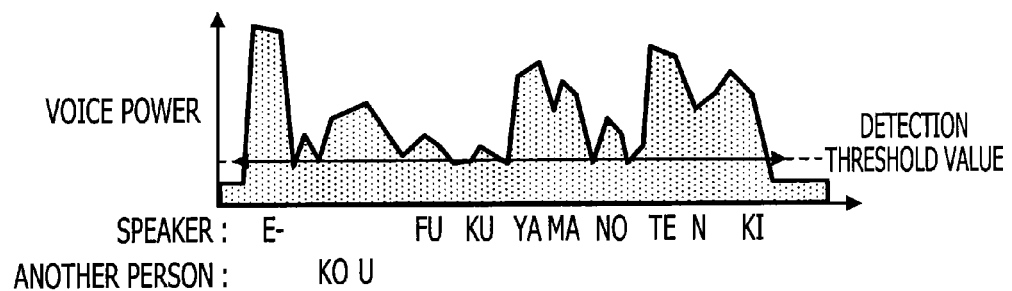

The graphs in FIGS. 8A and 8B indicate examples of a state of change in time of voice power of vocal sound in a vocal section. The graphs represent a state in which a person to be recognized produces sound "E-, FUKUYAMA NO TENKI (er, weather in Fukuyama)", and another person produces sound "KOU" beside that. In these graphs, the horizontal axis represents passage of time, and the vertical axis represents voice power. Here, if it is assumed that a noise level in this vocal section is fixed, it is possible to consider that a change of voice power in time directly represents a change of the SNR in the vocal section.

First, the graph in FIG. 8A indicates the case where a detection threshold value used by the selection unit 18 for selecting a word is set high so that the matching result by the matching unit 14 of the vocal sound of the other person "KOU" is excluded from a selection target of the selection by the selection unit 18. This detection threshold value corresponds to the lower limit threshold value described above. If the detection threshold value is set in this manner, voice power of a vocal section, in which voice power of the vocal sound of a person to be recognized is relatively low, for example, a vocal sound "FUKU", becomes lower than the detection threshold value, and thus a matching result of the vocal sound "FUKU" by the matching unit 14 is excluded from the selection target.

On the other hand, the graph in FIG. 8B indicates the case where the detection threshold value used by the selection unit 18 for selecting a word is set low so that the matching result by the matching unit 14 of the vocal sound "FUKU" of the person to be recognized, described above, is selected. If the detection threshold value is set in this manner, voice power of the vocal section of the vocal sound "KOU" of the other person exceeds the detection threshold value this time, and thus a matching result of the vocal sound "KOU" by the matching unit 14 becomes the selection target.

In this manner, if the lower limit threshold value used by the selection unit 18 for selecting a word is set to be a fixed value all the time, there are cases where the operation, by the selection unit 18, of selecting a word of vocal sound of a person to be recognized, and excluding a word of vocal sound of the other person becomes not suitable. Thus, the threshold value calculation unit 41 calculates a lower limit threshold value of a word to be selected by the selection unit 18 based on reading information of the word. In this manner, the above-described operation by the selection unit 18 becomes more suitable. Even if a vocal section includes vocal sound of the other person, it becomes more suitable to provide a result of voice recognition of vocal sound of a person to be recognized.

In the present embodiment, the voice recognition apparatus 10 in FIG. 7, which has the above-described functional configuration, is achieved using the computer 20 including the hardware configuration illustrated in FIG. 2. For this purpose, for example, a control program for causing the MPU 21 to perform the below-described control processing performed on the voice recognition apparatus 10 is stored, for example, in a hard disk unit 24 or a portable recording medium 30 in advance. And the MPU 21 receives a given instruction to read and execute this control program. In this regard, the word dictionary 15 and the acoustic model 16 are stored, for example, in the hard disk unit 24 in advance. Alternatively, the word dictionary 15 and the acoustic model 16 may be stored in an external storage device connected through the interface unit 27. In this manner, it becomes possible for each of the components in FIG. 2 to function as a corresponding functional block included in the voice recognition apparatus 10 in FIG. 7.

Figure 9:
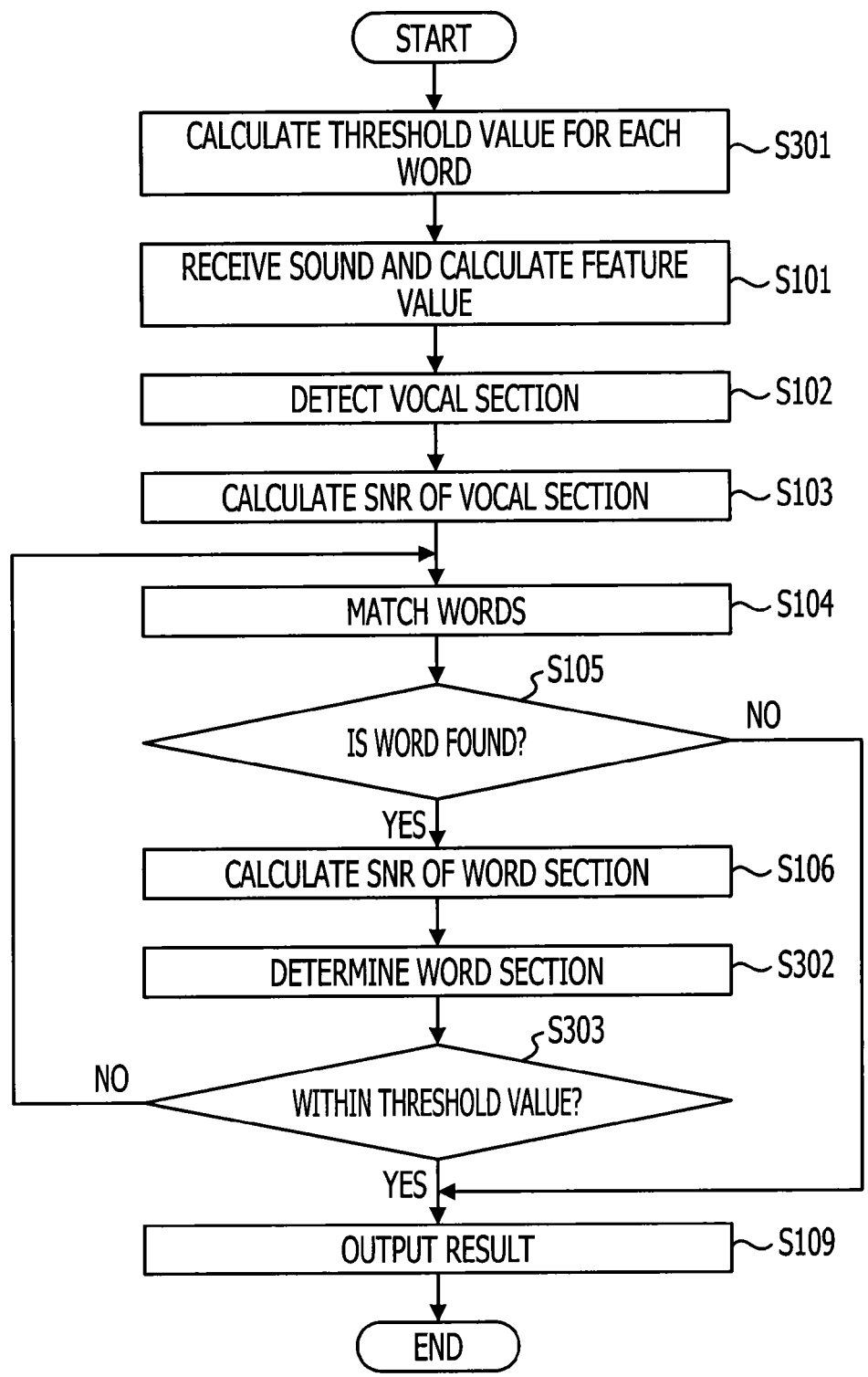
FIG. 9 is a flowchart illustrating a control processing procedure performed by the voice recognition apparatus in FIG. 7.

Next, a description will be given of FIG. 9. FIG. 9 is a flowchart illustrating a control processing procedure performed by the voice recognition apparatus 10 in FIG. 7.

When the processing in FIG. 9 is started, first, in S301, the threshold value calculation unit 41 performs processing for calculating a lower limit threshold value to be used for selecting a word by the selection unit 18 for each word stored in the word dictionary 15 based on reading information of the word.

Here, a description will be given of a method of calculating this lower limit threshold value using the individual figures from FIG. 10 to FIG. 12.

First, a description will be given of FIG. 10. FIG. 10 is an example of a syllable threshold value table to be used by the threshold value calculation unit 41 for calculating the above-described lower limit threshold value. In this table, each of Japanese language syllables is associated with a threshold value of the syllable. For the threshold value for each syllable, for example, voice power for each syllable is measured using voice data collected in advance, and a logarithm value of the measured value is calculated. The obtained value is normalized by being divided by the maximum value of the logarithm value of voice power in the voice data, and is used.

In this regard, for the syllable threshold value table, for example, a table in which a value based on a power difference of a vowel is associated as a threshold value for each vowel of a syllable may be used in place of this. Namely, for example, a syllable pertaining to the a-row in the Japanese syllabary may have a threshold value of "0.90", a syllable pertaining to the i-row may have "0.60", a syllable pertaining to the u-row, for example, may have a threshold value of "0.70", a syllable pertaining to the e-row may have a threshold value of "0.80", and a syllable pertaining to the o-row may have a threshold value of "0.85", for example.

In this regard, in the case where the voice recognition apparatus 10 in FIG. 7 is achieved using the computer 20 including the hardware configuration illustrated in FIG. 2, the syllable threshold value table is, for example, stored in the hard disk unit 24 in advance.

The threshold value calculation unit 41 obtains threshold values for individual syllables included in a syllable string indicating the reading of a word by referring to the syllable threshold value table, calculates the average value of the threshold values obtained for the individual syllables, and determines the calculated average value to be a lower limit threshold value of the word.

For example, in the case of calculating a lower limit threshold value of the word "FUKUYAMA", first, the threshold value calculation unit 41 refers to the word dictionary 15, and obtains the reading "FU-KU-YA-MA" of the word "FUKUYAMA". Next, the threshold value calculation unit 41 disassembles the reading "FU-KU-YA-MA" into syllables "FU", "KU", "YA", and "MA", refers to the syllable threshold value table, and then refers to a threshold value of each syllable. Here, it is assumed that threshold values "0.75", "0.70", "0.90", and "0.85" are obtained for the syllables "FU", "KU", "YA", and "MA", respectively, from the syllable threshold value table. Here, the threshold value calculation unit 41 calculates the average value of the four threshold values, and obtains the average value "0.80" as a result of the calculation. The threshold value calculation unit 41 stores the calculated average value "0.80" as the lower limit threshold value of the word "FUKUYAMA" into the word dictionary 15. FIG. 11 illustrates an example of the word dictionary 15 in which lower limit threshold values calculated in this manner are stored for individual words.

In this regard, in the case where the voice recognition apparatus 10 in FIG. 7 recognizes an English word, the threshold value calculation unit 41 calculates the above-described lower limit threshold value using a phoneme threshold value table. FIG. 12 is an example of the phoneme threshold value table. In this table, each phonetic symbol representing a phoneme is associated with a threshold value of the phoneme. For the threshold value for each phoneme, for example, voice power for each phoneme is measured using voice data collected in advance, and a logarithm value of the measured value is calculated. The obtained value is normalized by being divided by the maximum value of the logarithm value of voice power in the voice data, and is used.

For example, in the case of calculating a lower limit threshold value of the word "sky", first, the threshold value calculation unit 41 refers to the word dictionary 15, and obtains the pronunciation of the word "sky", namely "skai". Next, the threshold value calculation unit 41 disassembles the pronunciation "skai" into phonemes "s", "k", "a", and "i", refers to the syllable threshold value table, and refers to a threshold value for each syllable. Here, it is assumed that threshold values "0.7", "0.8", "0.9", and "0.75" are obtained for phonemes "s", "k", "a", and "i", respectively, from the syllable threshold value table. Here, the threshold value calculation unit 41 calculates the average value of the four threshold values, and obtains the average value "0.79", and this value becomes the lower limit threshold value of the word "sky".

Also, for example, in the case of calculating a lower limit threshold value of the word "throw", first, the threshold value calculation unit 41 refers to the word dictionary 15, and obtains the pronunciation of the word "throw", "θrou". Next, the threshold value calculation unit 41 disassembles the pronunciation "θrou" into phonemes "θ", "r", "o", and "u", refers to the syllable threshold value table, and refers to a threshold value for each syllable. Here, it is assumed that threshold values "0.7", "0.7", "0.9", and "0.8" are obtained for phonemes "θ", "r", "o", and "u" from the syllable threshold value table. Here, the threshold value calculation unit 41 calculates the average value of the four threshold values, and obtains the average value "0.78", and this value becomes the lower limit threshold value of the word "throw".

In this regard, in the case where the voice recognition apparatus 10 in FIG. 7 is achieved using the computer 20 including the hardware configuration illustrated in FIG. 2, the phoneme threshold value table is, for example, stored in the hard disk unit 24 in advance.

In the case where the voice recognition apparatus 10 in FIG. 7 recognizes an English word, the threshold value calculation unit 41 first obtains threshold values of individual phonemes included in the phoneme string representing the English word by referring to the phoneme threshold value table. And the threshold value calculation unit 41 calculates the average value of the threshold values obtained for the individual phonemes, and determines the calculated average value to be the lower limit threshold value of the English word.

Referring back to description of FIG. 9, the processing from S101 to S106, which follows S301, has the same processing contents as the flowchart illustrated in FIG. 3, and thus the description thereof will be omitted here.

In S302, which follows S106, the selection unit 18 performs processing for determining whether the SNR of the word section calculated by the processing in S106 matches a given condition in the same manner as the processing of S107 in FIG. 3. Note that, in S302, the selection unit 18 performs processing for determining whether the SNR of the word section is not lower than the product of the SNR of the vocal section calculated in S103, and the lower limit threshold value, calculated in the processing in S301, on the word identified by the processing in S104. For example, if the SNR of the vocal section is "7.00", and the identified word is "FUKUYAMA", in S302, the selection unit 18 performs processing of determining whether the SNR of the word section of the word "FUKUYAMA" is not lower than 7.00×0.80=5.60 based on FIG. 11.

In S303, the selection unit 18 performs processing of determining whether or not the SNR of the word section calculated by the processing in S106 matches a given condition as a result of the determination in the processing in S302. Here, if the SNR of the word section matches the given condition (when the determination result is Yes), the selection unit 18 determines the word identified by the processing in S104 to be the selection result, and after that, the processing proceeds to S109. On the other hand, here, if determined that the SNR of the word section does not match the given condition (when the determination result is No), the processing returns to S104, and the selection unit 18 causes the matching unit 14 to perform processing for identifying another word.

In S109, the output unit 19 performs processing for outputting the processing result in FIG. 9, and after that, the processing in FIG. 9 is terminated. If the processing in S109 is performed next to the processing in S108, the output unit 19 outputs the word selected by the selection unit 18 in the processing in S108 as described above. Also, if the processing in S109 is performed next to the processing in S105, the output unit 19 outputs a notification that a result of the voice recognition has not been obtained, or outputs nothing.

The voice recognition apparatus 10 in FIG. 7 performs the above control processing so as to suitably provide a result of the voice recognition targeted only for vocal sound of a person to be recognized even if vocal sound of the other person is included.

In this regard, in each of the voice recognition apparatuses 10 in FIG. 1, FIG. 4, and FIG. 7, the first calculation unit 13 calculates the SNR of the vocal section, and the second calculation unit 17 calculates the SNR of the word section. In place of this, the first calculation unit 13 may calculate the average power of the audio signal of the vocal section, and the second calculation unit 17 may calculate the average power of the audio signal of the word section. In this regard, in this case, the selection unit 18 selects a word expressed by the vocal section of the word section based on a comparison result between the average power of the audio signal of the word section and the average power of the audio signal of the vocal section. With each of the voice recognition apparatuses 10 in FIG. 1, FIG. 4, and FIG. 7 configured in this manner, it becomes possible to suitably provide a result of the voice recognition targeted only for vocal sound of a person to be recognized even if vocal sound of another person is included.

In this regard, the first calculation unit 13 may calculate the average power of the audio signal of a vocal section, for example, in the following manner.

Namely, the first calculation unit 13 first divides the vocal section into frames having a fixed time interval, and obtains voice power of the individual frames. And the first calculation unit 13 identifies a given number of frames in descending order of voice power, calculates the average value of the voice power of the given number of identified frames, and determines the average value to be the average power of the audio signal of the vocal section. In this regard, in place of this, the first calculation unit 13 may calculate the average value of the voice power of the frames included in a given ratio of frames (for example, the top 10 percent) when the individual frames are arranged in descending order of voice power, and may determine the average value to be the average power of the audio signal of the vocal section.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A voice recognition method comprising:
   detecting a vocal section including a vocal sound in a voice, based on a feature value of an audio signal representing the voice;
   identifying a word expressed by the vocal sound in the vocal section, by matching the feature value of the audio signal of the vocal section and an acoustic model of each of a plurality of words; and
   selecting, with a processor, the word expressed by the vocal sound in a word section based on a comparison result between a signal characteristic of the word section and a signal characteristic of the vocal section, wherein
   the selecting includes selecting the word expressed by the vocal sound in the word section having a signal characteristic not less than a given lower limit threshold value and not greater than a given upper limit threshold value with respect to the signal characteristic of the vocal section, and
   the signal characteristic of the word section and the signal characteristic of the vocal section are one of Signal-to-Noise Ratio (SNR) or Average Power.

2. The voice recognition method according to claim 1, wherein
   the selecting includes selecting the word expressed by the vocal sound in the word section having a signal characteristic not less than a given lower limit threshold value with respect to the signal characteristic of the vocal section.

3. The voice recognition method according to claim 2, wherein
   the selecting includes using the lower limit threshold value associated with each target word of the selecting.

4. The voice recognition method according to claim 3, further comprising:
   calculating the lower limit threshold value associated with each target word based on reading information of each target word.

5. The voice recognition method according to claim 4, wherein
   the calculating includes calculating the lower limit threshold value associated with each target word, by an average value of threshold values associated with individual syllables of reading of each word, respectively.

6. The voice recognition method according to claim 1, wherein
   the identifying includes
      obtaining a matching score indicating a height of similarity between the feature value of the audio signal of the voice section and the acoustic model of each of the plurality of words, and
      changing the matching score based on the comparison result between the signal characteristic of the word section and the signal characteristic of the vocal section, and
   the selecting includes selecting the word expressed by the vocal sound in the word section based on the matching score for the word.

7. The voice recognition method according to claim 6, wherein
   the changing includes changing the matching score of the word expressed by the vocal sound in the word section having a signal characteristic less than a given lower limit threshold value with respect to the signal characteristic of the vocal section, so as to lower the height of the similarity expressed by the matching score.

8. The voice recognition method according to claim 1, further comprising:
   calculating the signal characteristic of the vocal section based on a signal characteristic of a given section of the audio signal that includes the vocal section.

9. A voice recognition apparatus comprising:
a processor, coupled to a memory, configured to:
detect a vocal section including a vocal sound in a voice, based on a feature value of an audio signal representing the voice,
identify a word expressed by the vocal sound in the vocal section, by matching the feature value of the audio signal of the vocal section and an acoustic model of each of a plurality of words, and
select the word expressed by the vocal sound in a word section based on a comparison result between a signal characteristic of the word section and a signal characteristic of the vocal section, wherein
the processor is configured to select the word expressed by the vocal sound in the word section having a signal characteristic not less than a given lower limit threshold value and not greater than a given upper limit threshold value with respect to the signal characteristic of the vocal section, and
the signal characteristic of the word section and the signal characteristic of the vocal section are one of Signal-to-Noise Ratio (SNR) or Average Power.

10. The voice recognition apparatus according to claim 9, wherein
the processor is configured to select the word expressed by the vocal sound in the word section having a signal characteristic not less than a given lower limit threshold value with respect to the signal characteristic of the vocal section.

11. The voice recognition apparatus according to claim 10, wherein
the processor is configured to use the lower limit threshold value associated with each word to be a target of the selection process.

12. The voice recognition apparatus according to claim 11, wherein
the processor is further configured to calculate the lower limit threshold value associated with each target word based on reading information of each target word.

13. The voice recognition apparatus according to claim 12, wherein
the processor is configured to calculate the lower limit threshold value associated with each target word, by an average value of threshold values associated with individual syllables of reading of each word, respectively.

14. The voice recognition apparatus according to claim 9, wherein
the processor is further configured to:
obtain a matching score indicating a height of similarity between the feature value of the audio signal of the voice section and the acoustic model of each of the plurality of words, and
change the matching score based on the comparison result between the signal characteristic of the word section and the signal characteristic of the vocal section, and
the processor is configured to select the word expressed by the vocal sound in the word section based on the matching score for the word.

15. The voice recognition apparatus according to claim 14, wherein
the processor is configured to change the matching score of the word expressed by the vocal sound in the word section having a signal characteristic less than a given lower limit threshold value with respect to the signal characteristic of the vocal section, so as to lower the height of the similarity expressed by the matching score.

16. The voice recognition apparatus according to claim 9, herein
the processor is further configured to calculate the signal characteristic of the vocal section based on a signal characteristic of a given section of the audio signal that includes the vocal section.

17. A non-transitory computer-readable recording medium having stored therein a program for causing a computer to execute a voice recognition process comprising:
detecting a vocal section including a vocal sound in a voice, based on feature value of an audio signal representing the voice;
identifying a word expressed by the vocal sound in the vocal section, by matching the feature value of the audio signal of the vocal section and an acoustic model of each of a plurality of words; and
selecting the word expressed by the vocal sound in a word section based on a comparison result between a signal characteristic of the word section and a signal characteristic of the vocal section, wherein
the selecting includes selecting the word expressed by the vocal sound in the word section having a signal characteristic not less than a given lower limit threshold value and not greater than a given upper limit threshold value with respect to the signal characteristic of the vocal section, and
the signal characteristic of the word section and the signal characteristic of the vocal section are one of Signal-to-Noise Ratio (SNR) or Average Power.

* * * * *